Patented Jan. 28, 1930

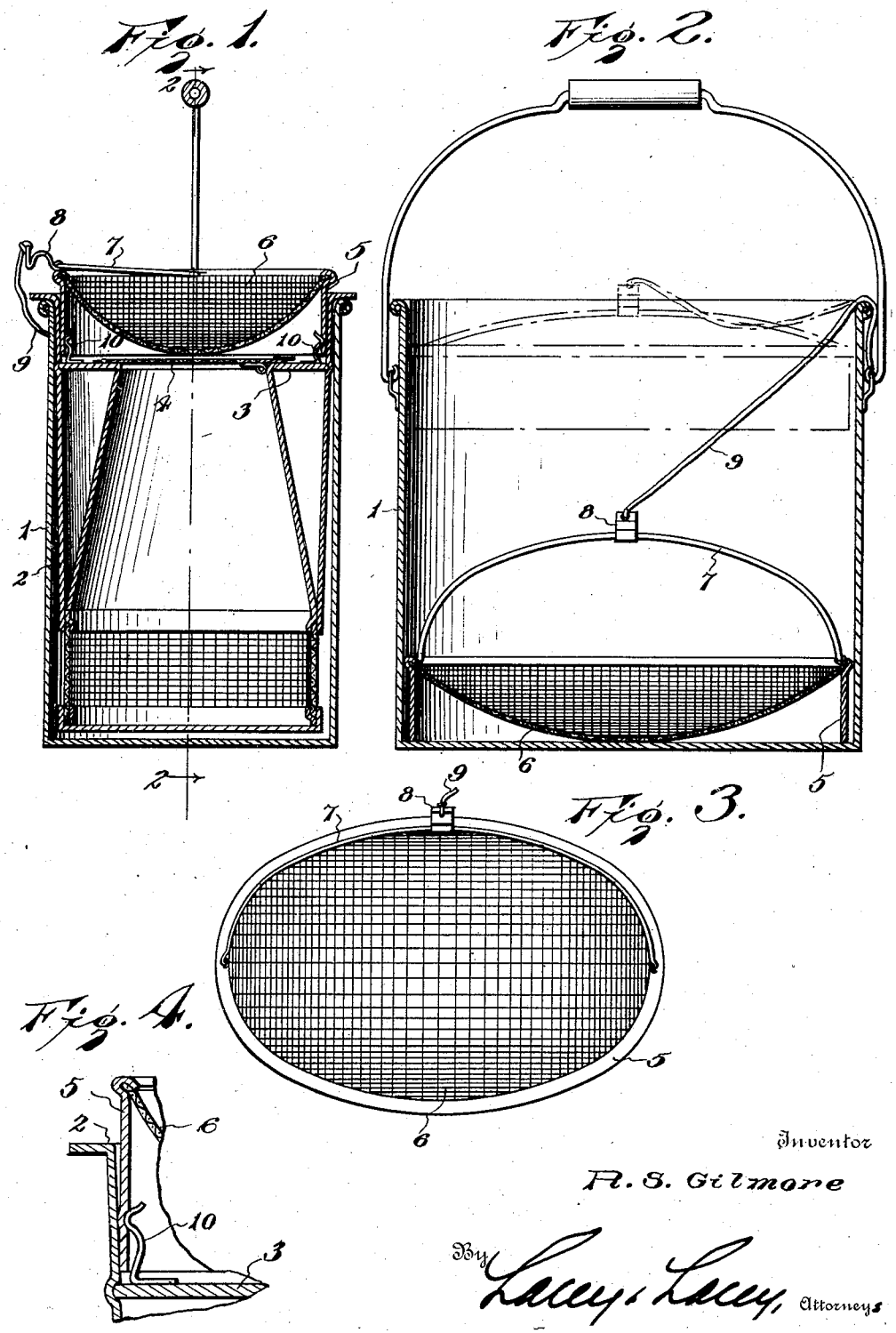

1,745,012

UNITED STATES PATENT OFFICE

ROBERT S. GILMORE, OF COLUMBIA, ILLINOIS

MINNOW BUCKET

Application filed July 28, 1928. Serial No. 295,920.

This invention relates to a bait bucket for anglers and enables the selection of bait with dispatch and a minimum chance of injury to the minnows or other lure used by the fisherman.

The invention consists of a tray for the bait having a concave bottom, whereby to centralize the bait and enable the selection to be made quickly and with ease and without endangering the life of the minnows or other form of bait provided for fishing.

While the drawing illustrates a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had in the following description and the drawing hereto attached, in which:—

Figure 1 is a vertical, central, transverse sectional view of a minnow bucket, provided with a bait tray or cup embodying the invention.

Figure 2 is a vertical, central, longitudinal, sectional view of the bucket on the line 2—2 of Figure 1, the inner receptacle being removed and the normal position of the bait tray being shown by full lines.

Figure 3 is a top plan view of the bait tray or cup.

Figure 4 is an enlarged fragmentary sectional view showing the position of the parts when assembled.

Corresponding and like parts are referred to in the following description and designated in the several views of the drawing by like reference characters.

The numeral 1 denotes the pail or bucket and 2 the inner receptacle for holding the bait. These parts may be of any well known construction. The inner receptacle 2 has an intermediate portion between its top and bottom made hollow to provide means for floating the receptacle when removed from the bucket or pail 1 and placed in a stream or other body of water. The top 3 of the hollow portion is disposed some distance below the top of the receptacle 2 and includes a cover 4 which closes the receptacle and prevents escape of the bait when the receptacle or holder 2 is placed in a body of water.

The tray or cup for the bait comprises a rim 5 and a bottom 6. The rim 5 constitutes the sides of the tray or cup and is preferably imperforate and of a size and shape to obtain a snug fit within the bucket 1 and upper portion of the inner receptacle or bait holder 2 without binding. The bottom 6 is of woven wire and of concave formation, substantially as indicated in Figures 1 and 2 of the drawing, whereby the tray or cup is deeper at the central point and decreases in depth towards the rim or sides 5. A bail 7 is pivotally connected to the tray or cup in line with its major axis. A hook 8 is applied to the bail 7 at a central point and is adapted to engage over the upper edge of the bucket 1 and hold the tray in elevated position substantially as indicated by the dotted lines in Figure 2.

A cord 9 is attached to the hook 8 and provides means for lifting the tray without necessitating dipping of the hand into the bucket.

When the fisherman is preparing for a trip the bait is placed in the receptacle or holder 2 and the tray or cup is positioned within the upper portion of the bait holder as indicated most clearly in Figures 1 and 4 of the drawing. Spring catches 10 at opposite sides of the receptacle 2 engage the rim or side of the tray or cup and prevent displacement thereof from the bait holder. When the fisherman reaches the field of operation the tray or cup is removed from the holder and the latter is lifted from the bucket 1 and a portion of the bait is supplied to the bucket 1 from the holder 2, the latter being placed in the stream or body of water until such time as it may be required to obtain a fresh supply of bait therefrom. Preliminary to supplying the bucket 1 with bait the tray or cup is introduced into the bucket and is permitted to drop to the bottom thereof, as indicated by the full lines in Figure 2 of the drawing. When it is required to obtain a bait the tray or cup is lifted to the top of the bucket 1 as indicated by the dotted lines in Figure 2 and is supported in this position by engaging the hook 8 over the top of the bucket. The fisherman is thus enabled to select a bait with ease and dispatch because of the concave formation of the bottom 6 of the tray or cup. After the bait has been selected the tray is released and permitted to drop to the bottom of the bucket.

When the tray or bait cup and the receptacle or holder 2 occupy the position within the bucket or pail 1, substantially as indicated in Figure 1 of the drawings, a piece of ice may be placed within the tray so as to keep the water cool and prolong the life of the minnows. When the inner receptacle or holder 2 is removed from the bucket and the tray is placed therein movement of the tray through the water creates a circulation of air thereby materially adding to the life of the bait. During the fishing only a small portion of the bait is removed from the holder 2 and supplied to the bucket 1, the holder or inner receptacle 2 being placed in the water to maintain the bait in fine condition. To obtain a bait the tray or cup is drawn to the top of the bucket 1 thereby bringing the minnows within convenient reach for selection to meet requirements. When the bait has been exhausted from the bucket 1 the latter is replenished from the holder or receptacle 2, this operation being repeated as often as necessary.

Having thus described the invention, I claim:—

1. The combination with a receptacle, and spring catches applied thereto, of a bait tray or cup insertable within the receptacle and provided with a rim, adapted to be retained in place by means of the spring catches engageable with the rim.

2. A minnow bucket comprising a pail, an inner receptacle having an intermediate portion made hollow to provide a float and having catches upon its upper end, a bait tray including an outer rim and a concave woven wire bottom and adapted to be loosely fitted within the pail or the upper portion of the receptacle, said catches being adapted to engage the rim for retaining the tray within the receptacle when placed therein.

In testimony whereof I affix my signature.

ROBERT S. GILMORE. [L. S.]